United States Patent
Wu

(10) Patent No.: US 9,395,486 B2
(45) Date of Patent: Jul. 19, 2016

(54) OPTICAL PRINTED CIRCUIT BOARD

(71) Applicant: HON HAI PRECISION INDUSTRY CO., LTD., New Taipei (TW)

(72) Inventor: Kai-Wen Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 462 days.

(21) Appl. No.: 13/781,764

(22) Filed: Mar. 1, 2013

(65) Prior Publication Data

US 2013/0315546 A1 Nov. 28, 2013

(30) Foreign Application Priority Data

May 28, 2012 (TW) .............................. 101118925 A

(51) Int. Cl.
*G02B 6/10* (2006.01)
*G02B 6/122* (2006.01)
*G02B 6/43* (2006.01)

(52) U.S. Cl.
CPC *G02B 6/10* (2013.01); *G02B 6/122* (2013.01); *G02B 6/43* (2013.01)

(58) Field of Classification Search
None
See application file for complete search history.

(56) References Cited

U.S. PATENT DOCUMENTS

| 2002/0009270 A1* | 1/2002 | Laor ................................ 385/95 |
| 2002/0061154 A1* | 5/2002 | Tsukamoto et al. ............ 385/14 |
| 2005/0190808 A1* | 9/2005 | Yonekura ................. G02B 6/43 372/50.1 |
| 2007/0086696 A1* | 4/2007 | Hsu ................................. 385/14 |
| 2012/0005890 A1 | 1/2012 | Kim |

FOREIGN PATENT DOCUMENTS

| CN | 101216576 A | 7/2008 |
| TW | 200708783 A1 | 3/2007 |
| TW | 201037804 A1 | 10/2010 |

* cited by examiner

*Primary Examiner* — Uyen Chau N Le
*Assistant Examiner* — Chad Smith
(74) *Attorney, Agent, or Firm* — ScienBiziP, P.C.

(57) ABSTRACT

An optical PCB includes a substrate, conductive traces, a solder resist layer, and a light waveguide. The substrate includes a surface. The surface includes a flat area. The conductive traces are formed on the surface of the substrate and only positioned outside of the flat area. The solder resist layer is formed on the substrate and covers the conductive traces. The light waveguide is positioned on the solder resist layer. An orthogonal projection of the light waveguide on the surface of the substrate coincides with the flat area.

1 Claim, 2 Drawing Sheets

OPTICAL PRINTED CIRCUIT BOARD

BACKGROUND

1. Technical Field

The present disclosure relates to an optical printed circuit board (PCB).

2. Description of Related Art

An optical PCB is a PCB that can transmit information using optical signals. Many optical PCBs include an insulated substrate, a printed circuit layer formed on a surface of the substrate, a solder resist layer applied to the printed circuit layer, and light waveguides positioned on the solder resist layer. The surface of the printed circuit layer will be uneven because of conductive traces. As such, the surface of the solder resist layer, on which the light waveguides are positioned, will not be flat, which makes it difficult to precisely position the light waveguides.

What is needed therefore is an optical PCB addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
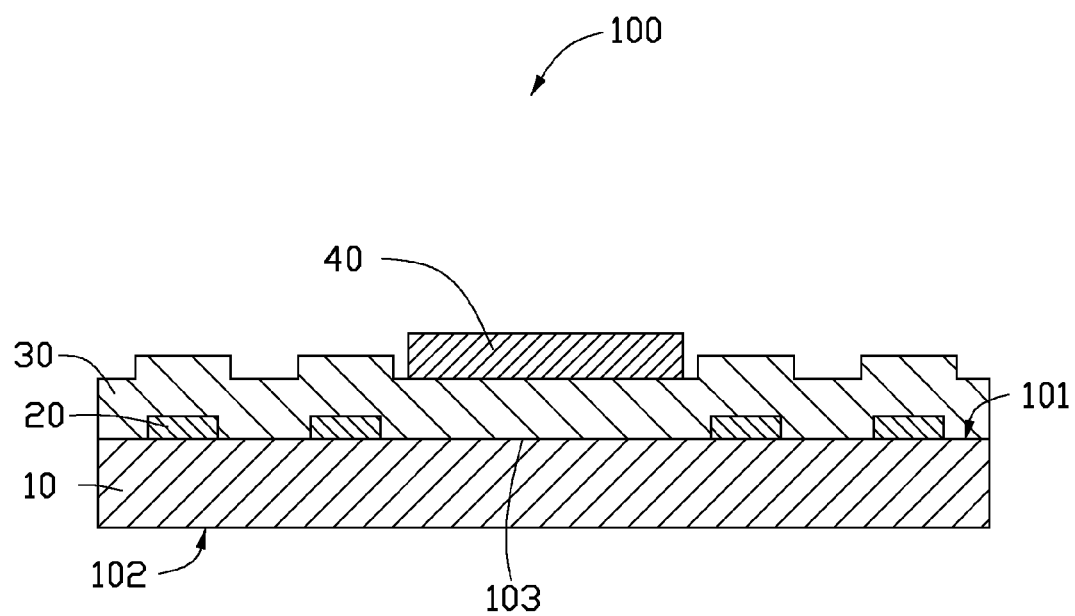
FIG. 1 is a cross-sectional schematic view of an optical PCB, according to a first exemplary embodiment of the present disclosure.

FIG. 1 shows an optical PCB 100 according to a first exemplary embodiment. The optical PCB 100 includes a substrate 10, a number of conductive traces 20 formed on the substrate 10, a solder resist layer 30 formed on the substrate 10 and covering the conductive traces 20, and a light waveguide 40 positioned on a surface of the solder resist layer 30 opposite to the conductive traces 20.

The substrate 10 includes a first surface 101 and an opposite second surface 102. The first surface 101 includes a first area 103 substantially coinciding with an orthogonal projection of the light waveguide 40 on the first surface 101.

The conductive traces 20 form one or more printed circuits (not labeled) of the optical PCB 100. The conductive traces 20 are only formed outside of the first area 103 on the first surface 101. In other words, the first area 103 is kept clear of the conductive traces 20 to provide a flat expanse to more stably precisely mount the light waveguide 40. The conductive traces 20 are made from a highly conductive material, in this embodiment, the conductive traces 20 are made from copper.

The solder resist layer 30 provides a protective coating for the conductive traces 20 and prevents solder from bridging between conductors, thereby preventing short circuits. A material of the solder resist layer 30 can be selected from ultraviolet (UV) curable printing ink or liquid photosensitive printing ink.

The light waveguide 40 is configured for transmitting optical signals. The light waveguide 40 may be a type of planar light waveguide or a type of strip light waveguide.

Figure 2:
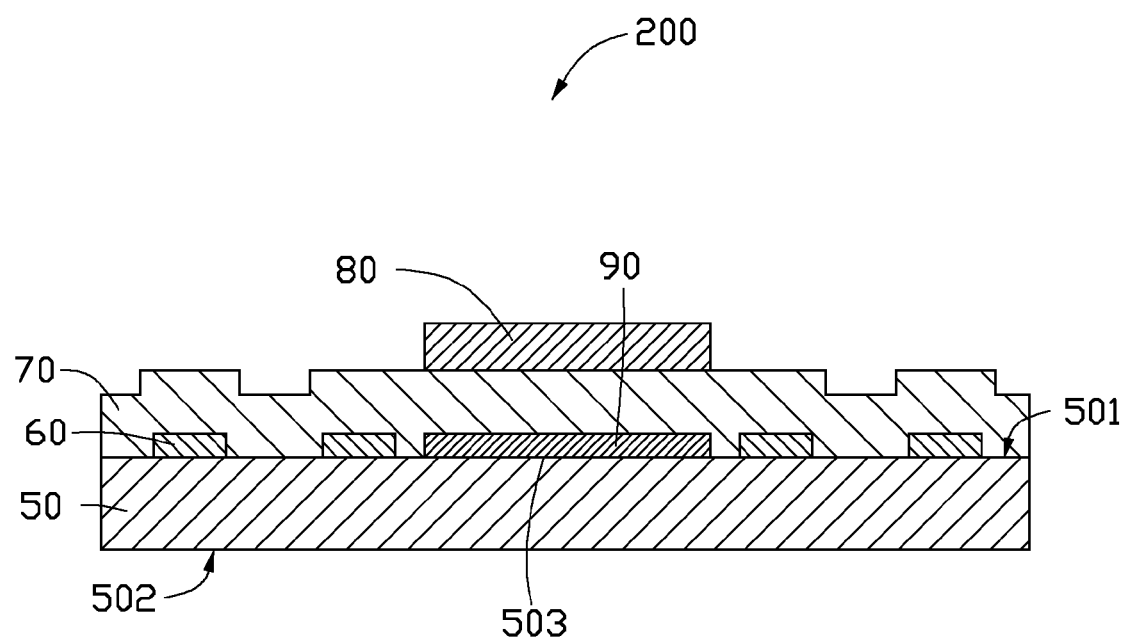
FIG. 2 is a cross-sectional schematic view of an optical PCB, according to a second exemplary embodiment of the present disclosure.

Referring to FIG. 2, which shows an optical PCB 200 according to a second exemplary embodiment. Similar to the first embodiment, the optical PCB includes a substrate 50, a number of conductive traces 60 formed on the substrate 50, a solder resist layer 70 formed on the substrate 50 and covering the conductive traces 60, and a light waveguide 80 positioned on a surface of the solder resist layer 70. The substrate 50 includes a first surface 501 and an opposite second surface 502. The first surface 501 includes a first area 503 substantially coinciding with an orthogonal projection of the light waveguide 80 on the first surface 501. The first area 503 is kept clear of the conductive traces 60 to provide a flat expanse to more stably precisely mount the light waveguide 80. Different from the first embodiment, the optical PCB 200 further includes an adjusting sheet 90. The adjusting sheet 90 is positioned between the substrate 50 and the solder resist layer 70 covering the first area 503 of the first surface 501. The adjusting sheet 90 is configured for adjusting a height of the surface of the solder resist layer 70 above the first area 503 to adjust the height of the light waveguide 80 relative to the first surface 501, to align the light waveguide 80 with an optical/electrical element (not shown). Two opposite surfaces of the adjusting sheet 90 are flat surfaces. In this embodiment, the adjusting sheet 90 has the same thickness as the conductive traces 60 but may have a different thickness in other embodiments as required.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical PCB comprising:
    a substrate comprising a surface, the surface comprising a flat area;
    a plurality of conductive traces formed on the surface of the substrate and only positioned outside of the flat area;
    a solder resist layer formed on the substrate and covering the conductive traces; and
    a light waveguide positioned on the solder resist layer, an orthogonal projection of the light waveguide on the surface of the substrate coinciding with the flat area;
    wherein the light waveguide has a portion thereof extending beyond the solder resist layer;
    wherein the solder resist layer defines a concave, the light waveguide having a portion received in concave, the light waveguide having a height larger than a depth of the concave;
    wherein the optical PCB comprises an adjusting sheet positioned between the substrate and the solder resist layer in the flat area; and
    wherein the adjusting sheet is embedded into the solder resist layer.

* * * * *